(12) United States Patent
Kasahara et al.

(10) Patent No.: US 8,126,150 B2
(45) Date of Patent: Feb. 28, 2012

(54) STORAGE MEDIUM PROCESSING METHOD, STORAGE MEDIUM PROCESSING DEVICE, AND PROGRAM

(75) Inventors: Akihiro Kasahara, Sanbu-gun (JP); Akira Miura, Sagamihara (JP); Hiroshi Suu, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 929 days.

(21) Appl. No.: 11/570,074

(22) PCT Filed: Jun. 8, 2005

(86) PCT No.: PCT/JP2005/010477
§ 371 (c)(1),
(2), (4) Date: Jan. 30, 2007

(87) PCT Pub. No.: WO2005/125083
PCT Pub. Date: Dec. 29, 2005

(65) Prior Publication Data
US 2008/0260155 A1    Oct. 23, 2008

(30) Foreign Application Priority Data
Jun. 16, 2004   (JP) .................................. 2004-178432

(51) Int. Cl.
*H04L 9/08* (2006.01)
(52) U.S. Cl. ...................... 380/277; 380/278; 380/279
(58) Field of Classification Search .................. 380/277, 380/278, 279
See application file for complete search history.

(56) References Cited

U.S. PATENT DOCUMENTS

| | | | |
|---|---|---|---|
| 6,363,488 B1 * | 3/2002 | Ginter et al. ....................... | 726/1 |
| 6,477,649 B2 * | 11/2002 | Kambayashi et al. .......... | 726/27 |
| 2002/0136405 A1 * | 9/2002 | Hori .............................. | 380/203 |
| 2002/0194010 A1 * | 12/2002 | Bergler et al. .................... | 705/1 |
| 2003/0078097 A1 * | 4/2003 | Okamoto ......................... | 463/29 |
| 2005/0120232 A1 * | 6/2005 | Hori et al. ...................... | 713/193 |

FOREIGN PATENT DOCUMENTS

| | | |
|---|---|---|
| JP | 11-96675 | 4/1999 |
| JP | 11-224461 | 8/1999 |
| JP | 2000-293439 | 10/2000 |
| JP | 2002 245013 | 8/2002 |
| JP | 2003 69551 | 3/2003 |
| JP | 2003 216500 | 7/2003 |
| JP | 2004-38247 | 2/2004 |

* cited by examiner

*Primary Examiner* — Edan Orgad
*Assistant Examiner* — Bradley Holder
(74) *Attorney, Agent, or Firm* — Oblon, Spivak, McClelland, Maier & Neustadt, L.L.P.

(57) ABSTRACT

Spread of a forged storage medium is prevented suppressing an authentic storage medium's damage and trouble of a owner to the minimum. When there is an update request of user key data, the update history of the user key data concerning the shown above-mentioned medium identifier IDm is referred to. When judged that the update of the user key data concerning the shown medium identifier IDm not being performed within a predetermined period, the update of user key data is performed. The request of a update is refused when judged that the update of the user key data concerning the shown medium identifier IDm being performed within a predetermined period.

9 Claims, 8 Drawing Sheets

STORAGE MEDIUM PROCESSING METHOD, STORAGE MEDIUM PROCESSING DEVICE, AND PROGRAM

FIELD OF THE INVENTION

The present invention relates to a storage-medium processing method, a system, and a program, which enables a user terminal to acquire content data from a license center apparatus, by online-connecting a storage medium with a double key encryption scheme via the user terminal to the license center apparatus.

BACKGROUND OF THE INVENTION

In recent years, with development of information society, a content data distribution system is widely used. In this system, the content data including electronic data such as a book, newspaper, music, or an moving pictures, is distributed to a user terminal, which enables browsing of content data in the user terminal.

However, since electric content data (heretofore, it is referred to as "content data") can be copied easily, the electronic content data tends to induce illegal acts that disregard copyright. From a viewpoint of protecting content data from such an illegal act, content data is encrypted and recorded by the encryption key and is usually decoded at the time of reproducing.

Content data protection technologies like this include CPRM (Content Protection for Prerecorded Media) which uses a standardized encryption key scheme in SD audio, SD video, SD E-e-Publish (SD computer-assisted publishing) or the like (for example, refer to nonpatent literature 1) The encryption-key scheme adapted in this nonpatent literature 1 is an encryption single key scheme which enciphers a title key with a medium unique key. On the other hand, the encryption double key scheme in which the content key is doubly encrypted with the user key and the medium unique key is known (for example, refer to nonpatent literature 2). This kind of encryption double key scheme is used in MQbic (registered trademark) for example.

FIG. 10 is a schematic diagram showing the configuration of the SD card and a user terminal corresponding to the encryption double key scheme adopted in Mqbic. A SD card SDq is an example of a secure storage medium which securely stores data. The SD card SDq has a system area 1, a hidden area 2, a protection area 3, a user data area 4, and an encryption/decryption unit 5, and the data is stored in each area 1-4.

In a SD card SDq like this, key management information MKB (Media Key Block) and the medium identifier IDm are stored in the system area 1. The medium unique key Kmu is stored in the hidden area 2. The encrypted user key Enc (Kmu, Ku) is stored in the protection area 3 and the encrypted content key data Enc (Ku, Kc) is stored in the user data area 4. The expression of Enc (A, B) means the data B encrypted with data A in this specification. Here, the user key Ku is encryption/decryption key to the content key Kc, and is used in common also to two or more encrypted content key data Enc (Ku, Kc1) Enc (Ku, Kc2) . . . . Moreover, the subscript q of The SD card SDq denotes that it conforms to MQbic (registered trademark).

Here, the system area 1 is a read-only area which can be accessed from outside of the SD card. The hidden area 2 is a read-only area that the SD card itself refers to, and cannot be accessed at all from external. The protection area 3 is an area in which data read and write is possible from external of the SD card when authentication is accomplished.

The user data area 4 is an area in which read/writing is freely possible from outside of the SD card. The encryption/decryption unit 5 performs authentication key exchanging, and cryptography, and has a function of encryption/decryption.

The user terminal 10$q$ for reproducing operates logically as follows to such the SD card SDq. That is, the user terminal 10$q$, performs MKB processing of the key management information MKB read from the system area 1 of the SD card SDq with the device key Kd set up beforehand (ST1), to obtain a medium key Km. Next, the user terminal 10$q$ carries out the hash processing of both the medium key Km and the medium identifier IDm read from the system area 1 of the SD card SDq (ST2), and obtains the medium unique key Kmu.

Thereafter, the user terminal 10$q$ performs based on the medium unique key Kmu, an authentication process and a key exchanging process (AKE: Authentication Key Exchange) with the decryption/encryption unit 5 of the SD card SDq, to share a session key with the SD card SDq (ST3).

Note that the authentication and key exchanging process in the step ST3 succeeds when the medium unique key Kmu in the hidden area 2 referred to at the decryption/encryption unit 5 coincides with the medium unique key Kmu generated by the user terminal 10$q$, thereby the session key Ks being shared.

Then, the user terminal 10$q$ reads out the encrypted user key Enc (Kmu, Ku) from the protection area 3 through a cipher communication using the session key Ks (ST4). This results in the encrypted user key Enc (Kmu, Ku) being decrypted by the medium unique key Kmu (ST5). Then, the user key Ku will be obtained.

Finally, when the encrypted content key Enc (Ku, Kc) is read from the user data area 4 of the SD card SDq, the user terminal 10$q$ carries out the decryption processing of the encrypted content key Enc (Ku, Kc) with the user key Ku to obtain a content key Kc (ST5$q$). Finally, when the encrypted content data Enc (Kc, C) is read from Memory 11$q$, the user terminal 10$q$ performs the decryption processing of the encrypted content data Enc (Kc, C) with the content key Kc (ST6). Thereby, the user terminal 10$q$ reproduces the obtained content data C.

Note that although the above-mentioned example stores encrypted content data in the memory 11$q$ of the user terminal 10$q$, it may be stored in the external storage medium.

The above-mentioned encryption double key scheme stores encrypted content key data at the user data area 4 having a large memory capacitance compared to the protection area 3. Therefore, it has an advantage in that it can store a lot of encrypted content key data compared to encryption single key scheme.

Moreover, since the encryption double key scheme may store encrypted content data in the SD card, it may urge the distribution of encrypted content data.

Furthermore in the encryption double key scheme, the medium identifier as an identifier is given to each SD card, and a unique user key is issued per medium identifier. This user key is also encrypted and stored in the protection area (protected area) of an SD card. Encryption of the user key depends on the medium identifier, and the user key can be decoded only with a authentic player. For this reason, content data cannot be acquired even if a trespasser copies only a content key unjustly from a user data area.

DISCLOSURE OF THE INVENTION

Problem to be Solved

About the SD card, the existence of forged SD cards (forged storage medium) has been confirmed, and it is an pressing issue to prevent the spread or diffusion thereof. The main reason why such forged SD cards exist is, that some manufacturers given a license of the SD card committed injustice behind the scenes. There is a good chance that Hundreds of forged SD cards with the same medium identifier may be distributed.

Some of the owners of a forged SD card may be malicious, and the other may be ignorant (purchased it not recognizing it as forgery, and uses it). A forged card problem may be solved, by re-issuing a card given another medium identifier to the owner having an authentic card with the same medium identifier.

However, if counterfeit cards spread widely, and it explodes into a situation that clone SD cards having copied up to the user key or the like, may be diffused in the markets, it may be a serious issue. A clone SD card herein means a SD card in which everything, such as an MKB (Media Key Block), a medium identifier, medium unique key, an encrypted user key, an encrypted content key or the like is the same as the authentic SD card. That is when the owner of a clone SD card accesses a license center and acquires content data, accounting thereof is charged to the authentic SD card which has the same ID etc.

Therefore, it is important to prevent an usage of a forged SD card as much as possible for a legitimate operation of the system.

SUMMARY OF THE INVENTION

A storage medium processing method according to the invention uses a storage medium and a user terminal. The storage medium stores medium identifier data medium unique key data enabled to be generated based on the medium identifier data encrypted user key data in which user key data is encrypted so that it may be decrypted using the medium unique key data and encrypted content key data in which content key data is encrypted so that it may be decrypted using the user key data. The user terminal to which the storage medium is able to be connected retains encrypted content data in which content data is encrypted so that it may be decrypted using the content key data. The user terminal connected to the storage medium is enabled to access to a license center to obtain various kinds of data. The method comprises: a update requesting step in which the user terminal requests to the license center a update of the user key data in the storage medium submitting the medium identifier data; a update history reference step in which the license center refers to a update history of the user key data concerning to the medium identifier data submitted in the update requesting step; an update executing step in which the license center performs the update of the user key data based on the update request from the user terminal when it is judged that the update of the user key data concerning the submitted medium identifier data has not been performed within a predetermined period; and an update refusal step in which the license center refuses the update request from the user terminal when it is judged that the update of the user key data concerning the submitted medium identifier data has been performed within a predetermined period.

A storage medium processing device according to the invention is connected to a storage medium which stores medium identifier data, medium unique key data enabled to be generated based on the medium identifier data, encrypted user key data in which user key data is encrypted so that it may be decrypted using the medium unique key data, and encrypted content key data in which content key data is encrypted so that it may be decrypted using the user key data, and performs data processing of the storage medium via a user terminal retaining encrypted content data in which content data is encrypted so that it may be decrypted using the content key data.

The device comprises: a key delivery server which receives the update request of the user key data accompanied by submission of the medium identifier data from the user terminal, publishes new user key data when it is judged that the update request is proper, and transmits the user key data to the user terminal; and an update history database retaining a update history of the user key data per the medium identifier data, wherein the key delivery server, referring to the update history database, performs the update of the user key data based on the update request from the user terminal, when it is judged that the update of the user key data concerning the submitted medium identifier data has not been performed within a predetermined period and refuses the update request from the user terminal when it is judged that the update of the user key data concerning the submitted medium identifier data has been performed within a predetermined period.

A storage medium processing program according to the invention uses a storage medium and a user terminal. The storage medium stores medium identifier data, medium unique key data enabled to be generated based on the medium identifier data, encrypted user key data in which user key data is encrypted so that it may be decrypted using the medium unique key data, and encrypted content key data in which content key data is encrypted so that it may be decrypted using the user key data. The user terminal to which the storage medium can be connected retains encrypted content data in which content data is encrypted so that it may be decrypted using the content key data. And the user terminal connected to the storage medium is enabled to access to a license center to obtain various kinds of data. The program is configured to perform: a update requesting step in which the user terminal requests to the license center a update of the user key data in the storage medium submitting the medium identifier data; a update history reference step in which the license center refers to a update history of the user key data concerning to the medium identifier data submitted in the update requesting step; an update executing step in which the license center performs the update of the user key data based on the update request from the user terminal when it is judged that the update of the user key data concerning the submitted medium identifier data has not been performed within a predetermined period; and an update refusal step in which the license center refuses the update request from the user terminal when it is judged that the update of the user key data concerning the submitted medium identifier data has been performed within a predetermined period.

THE ADVANTAGE OF THE INVENTION

According to this invention, in order to continuously use a storage medium, when the owner of a storage medium transmits the update request of user key data to a license center medium identifier data is submitted from a user terminal. The license center refers to the update history of the user key data concerning the shown medium identifier data.

When it is judged that the update of the user key data concerning the submitted medium identifier data has not been performed within a predetermined period, the update of the user key data is performed. On the other hand, the update request is refused when it is judged that the update of the user key data concerning the submitted medium identifier data has been performed within a predetermined period.

Thereby, for example, when the owner of a forged storage medium requests the update of user key data later than the owner of an authentic storage medium, the update request is refused and the forged storage medium becomes impossible to be continuously used as a storage medium due to the expiry term.

On the other hand, the owner of an authentic storage medium can be protected, even if he or she requests the update of the user key later than the owner of a forged storage medium. In that case, he or she can receive a confirmation of user registration data or the like thereafter and receive a storage medium which has another piece of medium identifier data assigned.

Therefore, according to the present invention spread of forged storage media can be prevented, while suppressing damages and labors of owners of an authentic storage medium to the minimum.

DETAILED DESCRIPTION

Hereafter, embodiments of the present invention will now be described with reference to the drawings.

Figure 1:
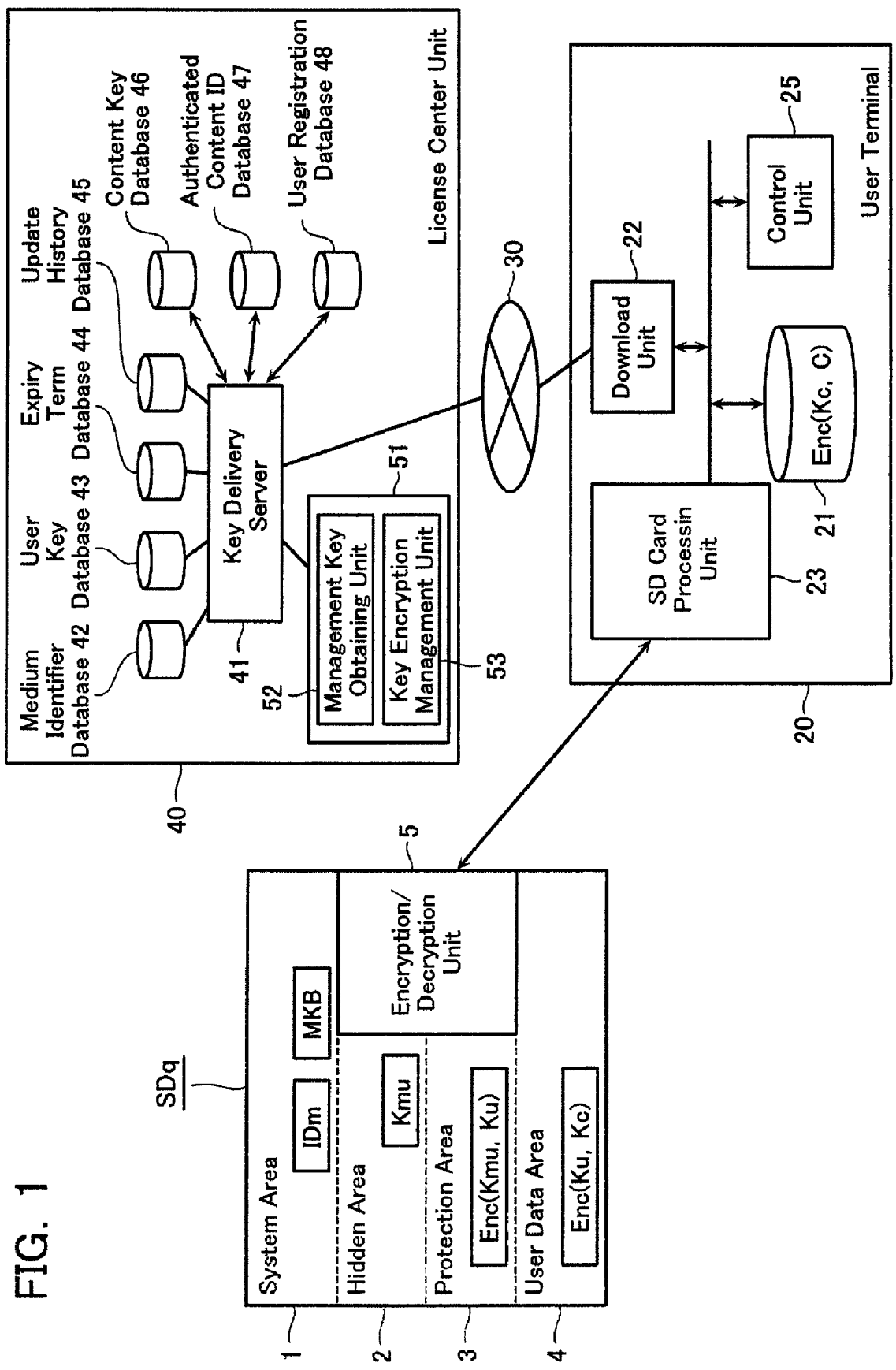
FIG. 1 is a diagram showing the configuration of the storage-medium processing system according to one embodiment of the present invention.

FIG. 1 is a diagram showing the configuration of the storage-medium processing system relating to the embodiment of the present invention.

Figure 10:
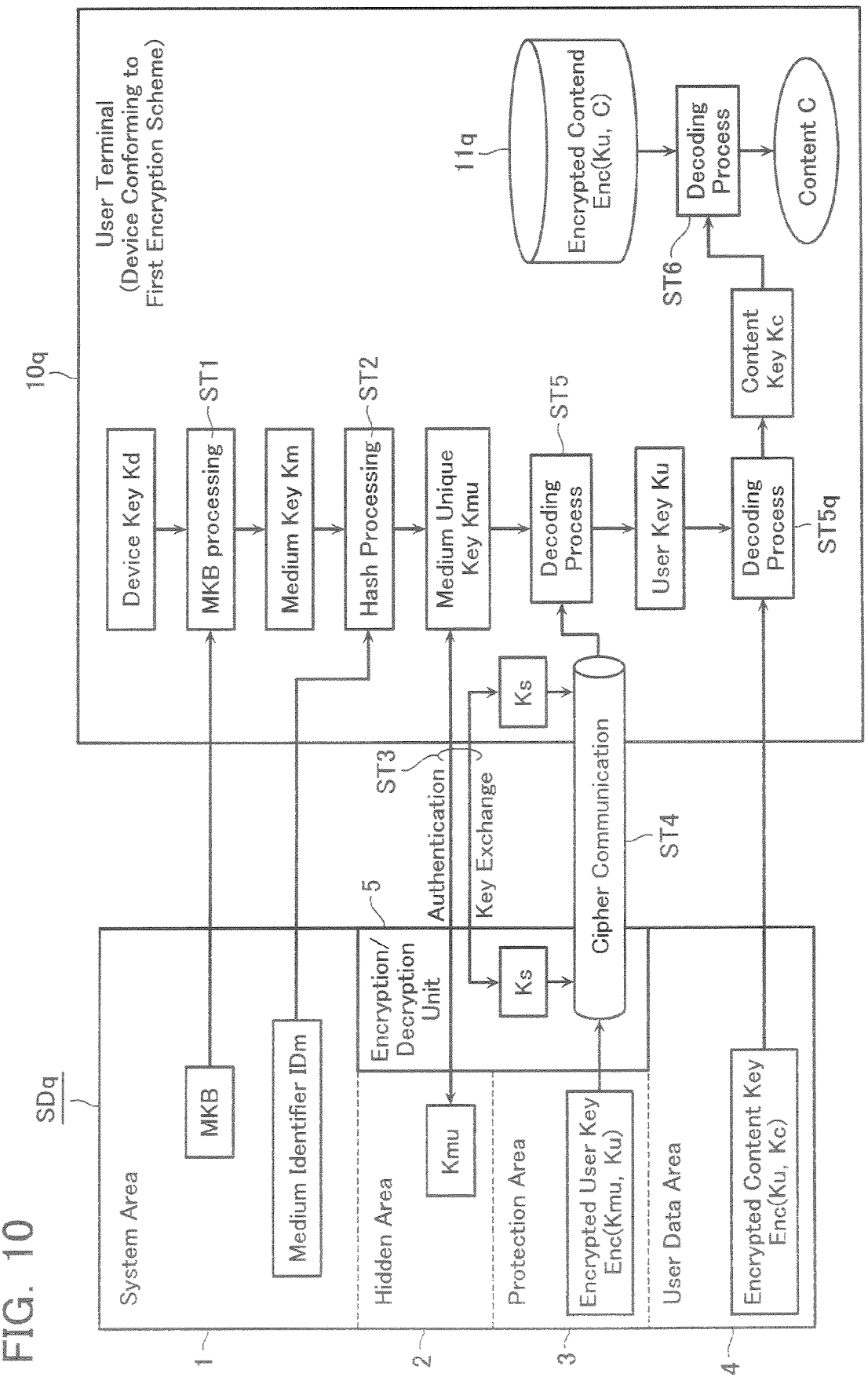
FIG. 10 is a diagram showing both the configuration of the SD card corresponding to the encryption double key scheme conventionally adopted in MQbic and a user terminal.

The same numerals are given to the same parts as FIG. 10, and detailed explanation is omitted for these parts. Different parts are hereafter mainly described.

Specifically, in the system of this embodiment, a user terminal 20, holding a SD card SDq freely attachable and detachable therein, is enabled to communicate through a network 30 to the license center unit 40.

The user terminal 20 is equipped with a memory 21, a download unit 22, a SD card processing unit 23, and a control unit 25. For a user terminal 20, any arbitrary device may be used, if it is an electronic instrument holding a SD card SDq attachable and detachable therein, such as a personal computer, a portable cellular phone, or a portable information terminal (personal digital assistant).

The memory 21 is a memory area which may be read and written from another unit 22-25. For example, the encrypted content data Enc (Kc, C) is stored therein.

The download unit 22 is controlled by the control unit 25, and it has a function of downloading the encrypted content key data Enc (Ku, Kc) and new user key Kun from the license center unit 40. For example, browser software or the like may be used therefor. The SD card processing unit 23 is controlled by the control unit 25, and has a function of authentication, a cipher communication, and reading/writing data stored in each of the areas 1, 3, and 4. The control unit 25 has usual computer functions and a function of controlling each of the unit 21-24 according to operation of a user.

The license center unit 40 comprises a key delivery server 41, a medium identifier database 42, a user key database 43, a expiry term database 44, an update history database 45, a content key database 46, an authenticated content ID database 47, and a user registration database 48.

The key delivery server 41 receives from the user terminal 20 through a network 30 a request of transmitting a content key.

In this case, after experiencing a certain authentication process, the key delivery server 41 has a function of returning to the user terminal 20 through a network 30 new content key data concerning the request.

Moreover, when a user key update request is received from the user terminal 20 through the network 30, the key delivery server 41 accesses the various databases 42, 44 and 45 or the like to judge the propriety of the request. When judged that the request is proper, it has a function of generating new user key data, and returning the new user key data or the like via the network 30 to the user terminal 20.

Furthermore, when judged that the request is not proper, the key delivery server 41 serves to answer that a generation of new user key data is refused.

The medium key database 42 holds data of the medium identifier IDm which each SD card has. The user key database 4 is for storing the user key which each SD card has, and user key which the key delivery server 41 newly generated corresponding to the user key update request.

The expiry term database 44 holds data about the term of expiry of the user key Ku which each SD card holds.

The update history database 45 holds update history data of the user key Ku of the SD card SDq in relation to the medium identifier IDm which each SD card SDq has.

The content key database 46 holds various content key data.

The authenticated content ID database 47 holds data of the content key data issued according to the request of an SD card owner, in relation to the medium identifier IDm of the SD card.

The user registration database 48 holds data about user registration which the SD card owner performed by showing own individual data (his or her address, name, or telephone number, etc).

By conducting a user registration, an owner of an authentic SD card can have a protection, such as receiving a new storage medium assigned another piece of medium identifier data, even if an owner of a forged SD card performs the update of a user key or the like beforehand, as described later.

The security module 51 is a unit performs encryption/decryption processing of the user key Ku and the content key Kc, and is equipped with a management key obtaining unit 52, and a key encryption management unit 53.

The management key obtaining unit 52 holds the management key readable from the key delivery server 41.

The key encryption management unit 53 has a function of receiving a setup of a management key by the key delivery serve 41, decoding the encrypted user key for management and the encrypted content key for management respectively, which are received from the key delivery server 41 based on the management key to obtain a user key and a content key, encrypting the content key and basic metadata with the user key, and transmitting to the delivery server 41 the encrypted content key (with basic metadata included therein) obtained and (additional) metadata such as a purchase date or the like.

Next, a storage-medium processing method conducted by the storage-medium processing system constituted as mentioned above is explained, using FIG. 2 or 9. An obtaining process of a content key is described first and the updating of a user key is explained thereafter.

(An Obtaining Process of a Content Key)

Figure 2:
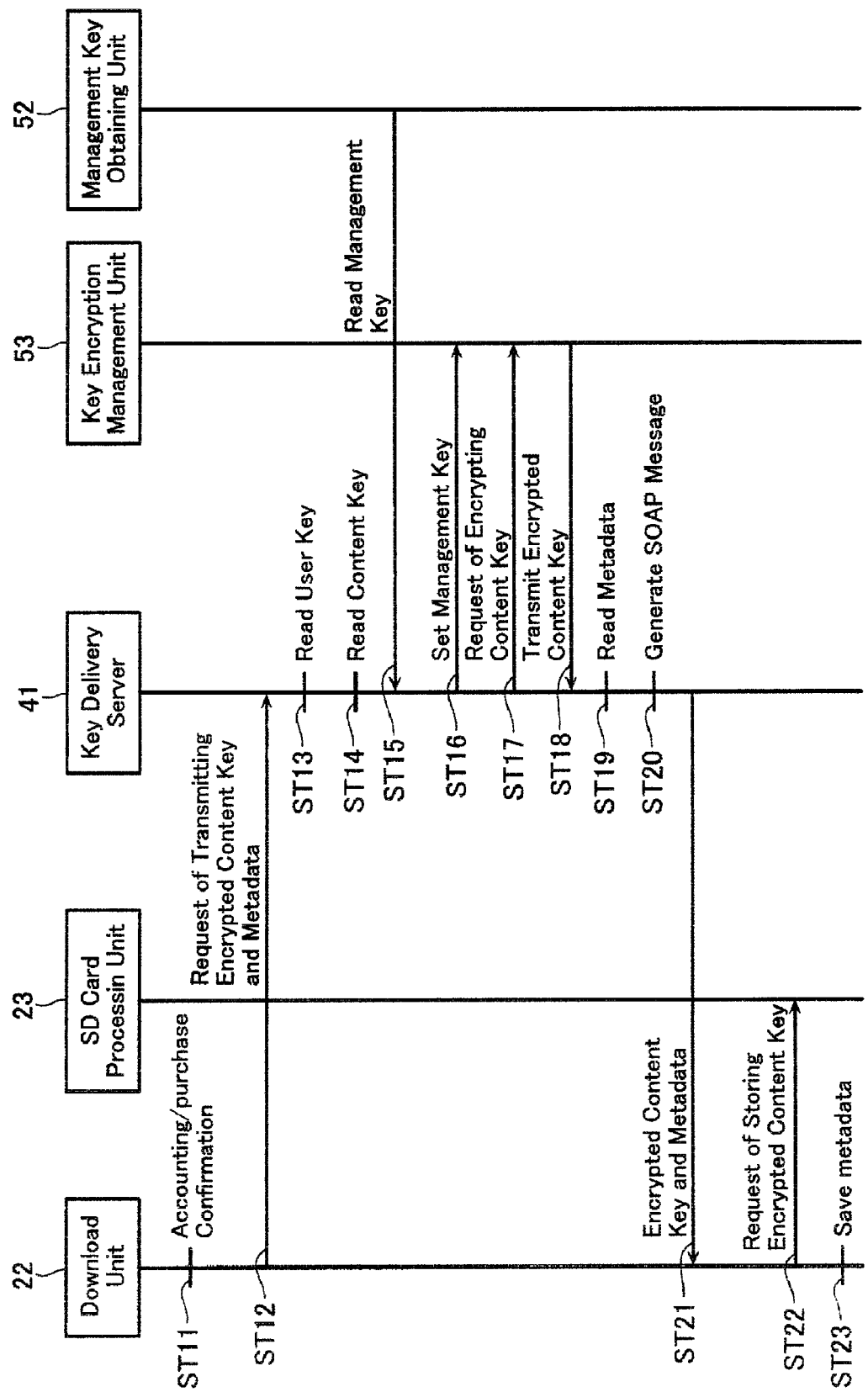
FIG. 2 explains a procedure in which a SD card acquires a content key through the user terminal.

The procedure of obtaining a content key by the SD card SDq through the user terminal 20 is explained with reference to FIG. 2. In the user terminal 20, the control unit 25 starts the download unit 22 according to the operation of a user, and as shown in FIG. 2, it checks that the download unit 22 has already purchased or finished accounting about a content key in advance (ST11). If the purchase has not been finished, the user terminal 20 performs purchase and settlement processing of a content key with the license center unit 40, and changes the content key into the status purchase or the accounting has finished.

Subsequently, the download unit 22 transmits a request of transmitting an encrypted content key to be obtained and metadata to the key delivery server 41 (ST12). Note that this request of transmitting contains at least the content ID corresponding to the encrypted content key, and the medium identifier IDm of the SD card SDq.

If the key delivery server 41 receives this request of transmitting, it reads from the user key database 43 the encrypted user key for management stored in advance for every medium identifier IDm (ST13), and reads the encrypted content key and basic metadata (the content ID, the title, the producer, and others) for management which were stored in advance for every content ID from the content key database 46 (ST14).

Thereafter, the key delivery server 41 reads the management key from the management key obtaining unit 52, and sets this management key in the key encryption management unit 53 (ST16), and transmits the request of encrypting the content key to the key encryption management unit 53 (ST17). Note that this encryption request contains the encrypted user key for management, the encrypted content key for management, and the basic metadata.

Based on the management key, the key encryption management unit 53 decodes the encrypted user key for management, and the encrypted content key for management, respectively, and obtains a user key and a content key. Thereafter, the key encryption management unit 53 transmits to the key delivery server 41 the encrypted content key (with basic metadata included therein) and metadata (it is additional) such as an purchase date, which were obtained by encrypting a content key and basic metadata with user key (ST18).

The key delivery server 41 reads the additional metadata (ST19), and generates a SOAP (Simple Object Access Protocol) message containing the encrypted content key and the metadata for example (ST20). And it transmits the encrypted content key and metadata to the user terminal 20 by the SOAP message (ST21). Note that the SOAP message is an example of a message scheme. It is needless to say that it may be changed into other schemes.

In the user terminal 20, the download unit 22 which received the simple object access protocol message transmits the request of storing an encrypted content key to the SD card processing unit 23. Note that the request of storing the encrypted content key contains only the encrypted content key out of the encrypted content key and the metadata. The SD card processing unit 23 writes this encrypted content key in the user data area 4 of the SD card SDq. Moreover, the download unit 22 saves the metadata that was not sent out to the SD card processing unit 23 (ST23). This ends an obtaining process of a content key.

(Updating Process of a User Key)

Figure 3:
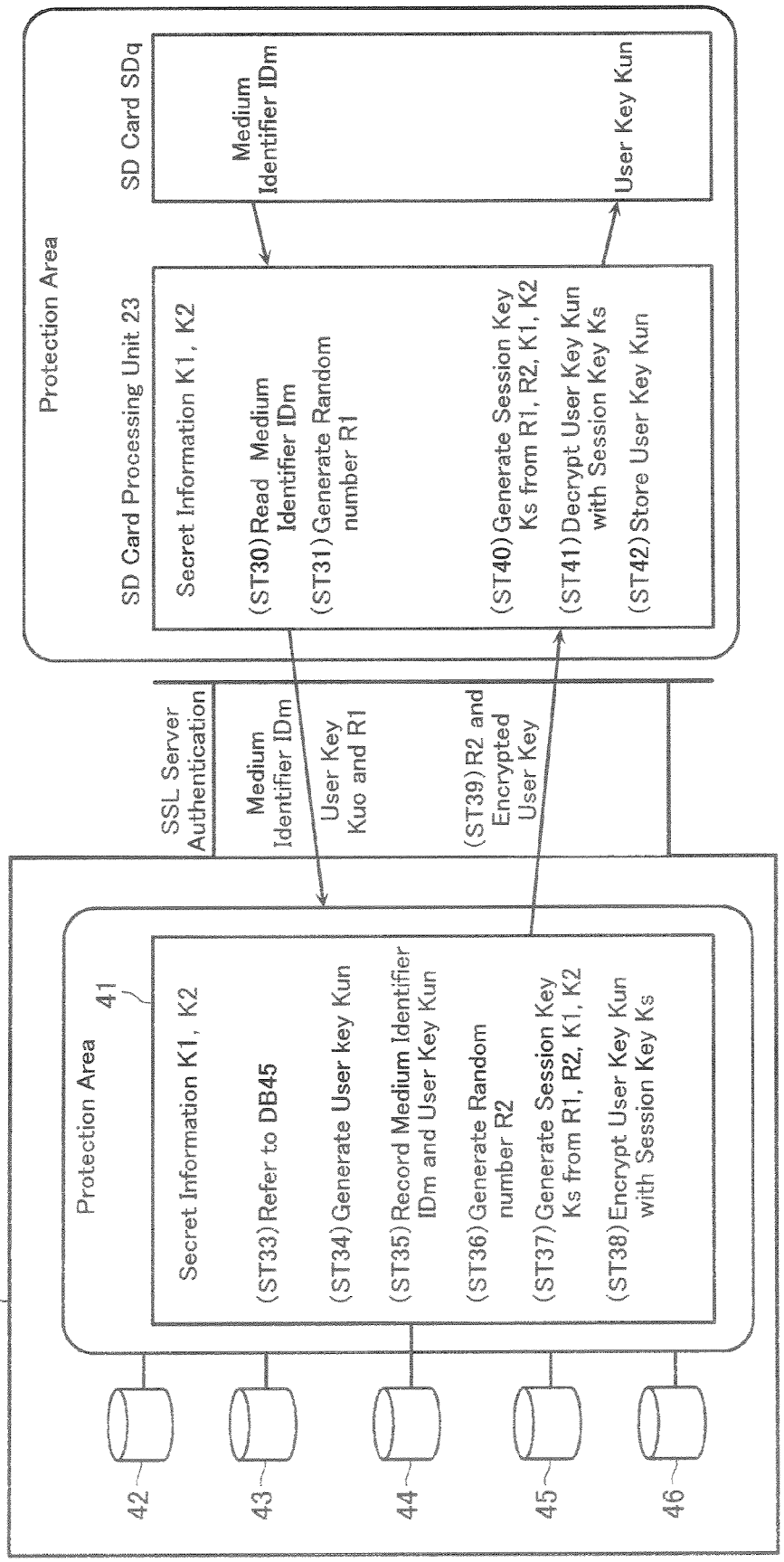
FIG. 3 explains a procedure for updating the user key.

Next the Procedure of the update of a user key is explained based on FIG. 3. In the user terminal 20, the control unit 25 starts the SD card processing unit 23 and the download unit 22 according to an operation of a user. The SD card processing unit 23 reads the medium identifier IDm of the SD card SDq from the system area 1 for the update request of a user key (ST30), and generates the random number R1 (ST31). This random number R1 is generated for authentication under challenge response using a common-key-encryption scheme, and for generation of a session key, in order to perform secure communication between the user terminal 20 and the license center unit 40.

Subsequently, the download unit 22 transmits the update request of the user key Ku to the key delivery server 41 (ST32). This update request contains the medium identifier IDm of the SD card SDq, the old user key data Kuo which is an object of an update, and the generated random number R1.

When the key delivery server 41 receives this transmission request, it refers to the update history database 45 for a update history by the medium identifier IDm as described later (ST33). If there is no update within a predetermined period, it will shift to the following step ST34. The case where an update is within a predetermined period will be mentioned later.

In ST34, the encrypted user key Kuo for management is read from the user key database 43, and the new user key data Kun in which the expiry term has been updated is generated based on this user key data Kuo.

Note that in this specification, a symbol Kuo shall be given to the old user key data Ku before an update, among user keys Ku, and Kun shall be given to the new user key data Ku after an update. Moreover, the length of the expiry term after an update can be variously changed according to situations.

Usually, it may be the same as the length of the expiry term before an update. However in special cases such as suspension of services in the license center because of certain situations, the expiry term may be made into a sufficiently long period, or the expiry term itself may be removed. The new user key data Kun is saved in the user key database 43 with this medium identifier IDm (ST35).

Then, the key delivery server 41 generates a random number R2 (ST36). Subsequently, the key delivery server 41 generates the session key Ks using the random number R1 received from the SD card processing unit 23, this random number R2, and the secret information K1 and K2 as a common encryption key (ST37).

The key delivery server 41 encrypts the new user key Kun using this generated session key Ks (ST38), and transmits the encrypted user key data Kun using the simple object access protocol message with the random number R2 to the SD card processing unit 23 through the download unit 25 (ST39).

The SD card processing unit 23 generates the session key Ks from the random number R1, R2, the secret information K1, and K2 (ST40), and decodes the encrypted user key Kun with the session key Ks (ST41). The decrypted user key Kun is again encrypted by the SD card processing unit 23 using the medium unique key Kmu, and is written in the protection area 4 of the SD card SDq (ST42). This ends the updating of the user key Ku.

Figure 4:
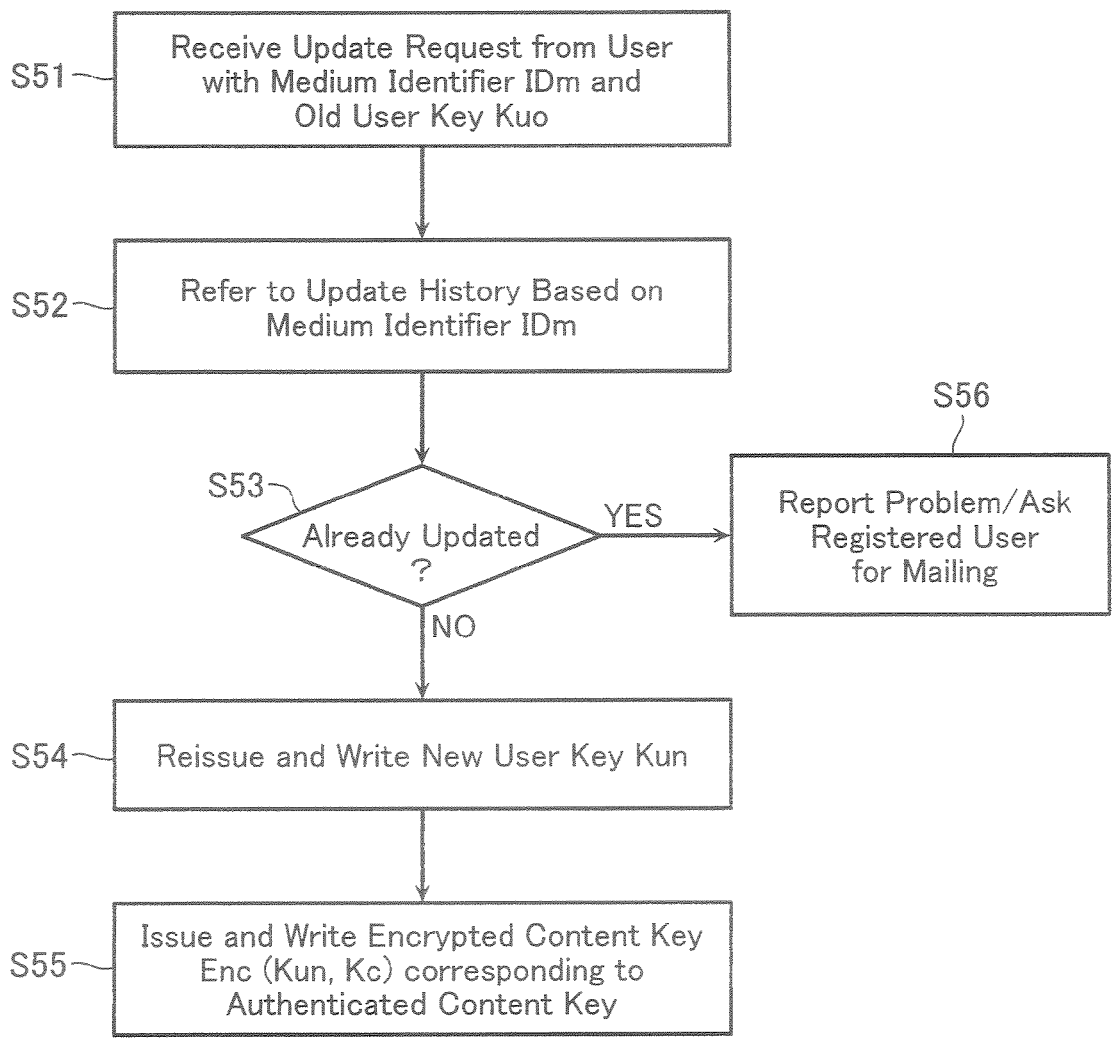
FIG. 4 is a flow chart explaining the case where an update with the same medium identifier has been performed within a predetermined period.

FIG. 4 explains the detail of the above-mentioned step ST33 including the case where it is judged that the update by the same medium identifier IDm is made within a predetermined period, as a result of a reference to the update history database 45. When the key delivery server 41 receives an update request with the medium identifier IDm and the old user key Kuo (S51), it refers to the update history database 45 for the update history of the user key Ku accompanied by presentation for the medium identifier Idm (S52).

Note that the update request of the user key Ks is performed when the user himself performs an update procedure spontaneously. Other cases include a case where the license center or the like detects the expiry term and an update procedure is automatically performed by a program.

As a result of a reference, when judged that the update has not been carried out within a predetermined period, a new user key Kun is re-issued (generated), and finally encrypts and writes it in the protection area 3 of the SD card SDq (S54).

Figure 5:
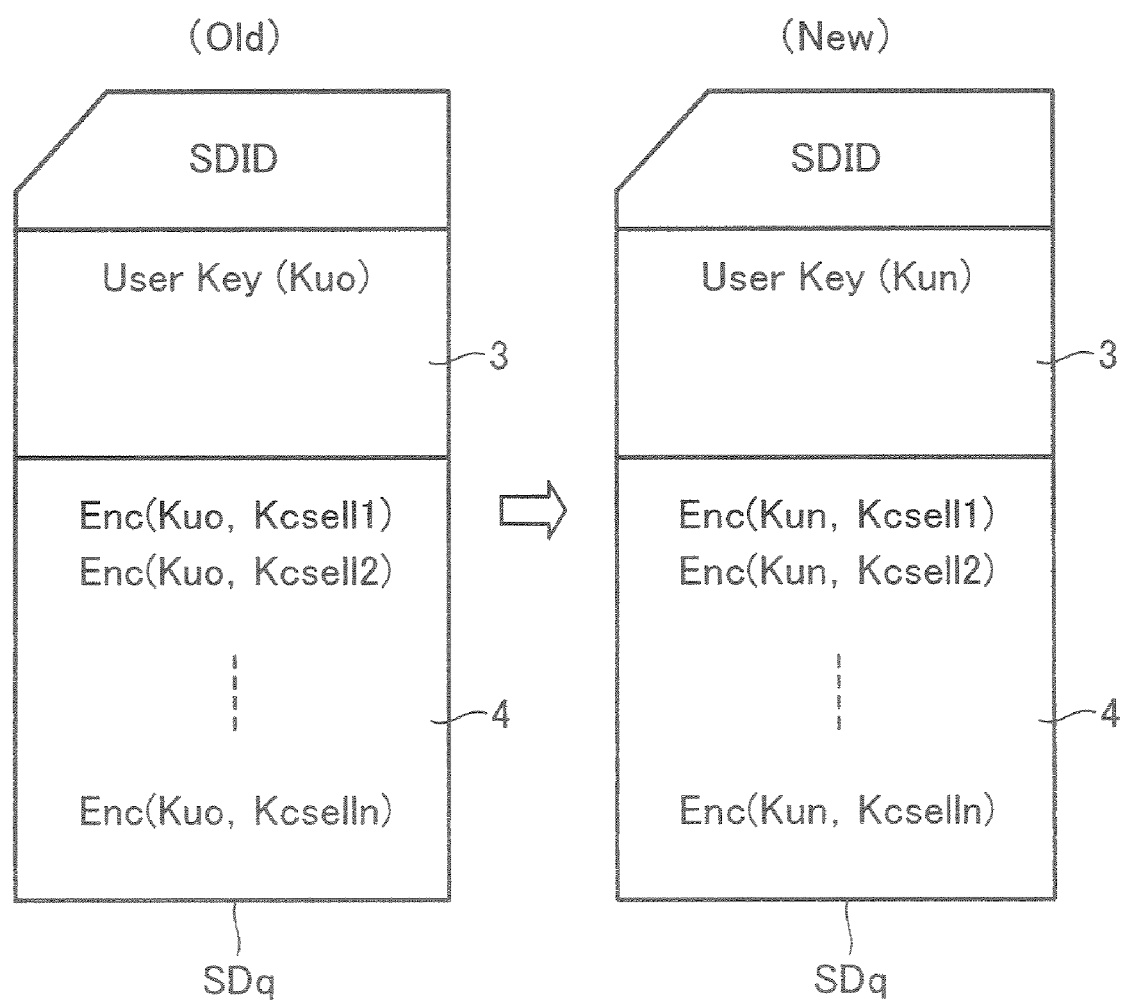
FIG. 5 illustrates changes in the stored data in a SD card before and after an update.

In the authenticated content ID database 47, instead of the content key Enc (Kuo, Kcselli) encrypted by the old user key Kuo and saved therein, the content key Enc (Kun, Kcselli) encrypted with the new user key Kun is generated (refer to ST55 and FIG. 5), although it is not explained in FIG. 2. This encrypted content key Enc (Kun, Kcselli) is transmitted to the SD card processing unit 23 of the user terminal 20 with the encrypted new user key Kun, for example in ST39 of FIG. 2.

On the other hand, when judged that the update has been carried out within a predetermined period in ST53, the key delivery server 41 informs that the update of the user key Ku by the same medium identifier IDm has already been carried out, and that the update of the user key Ku cannot be received immediately. It also asks the user (registered user) who is registering as a user to mail an SD card on hand (ST56). A process of mailed the SD card is mentioned later.

About reference step ST33 of the above-mentioned update history database 45, detailed procedure is explained with reference to FIG. 6, which is different from FIG. 4.

ST51'-ST53' and ST56' are the same as that of ST51-ST53 of FIG. 4, and ST56.

Figure 6:
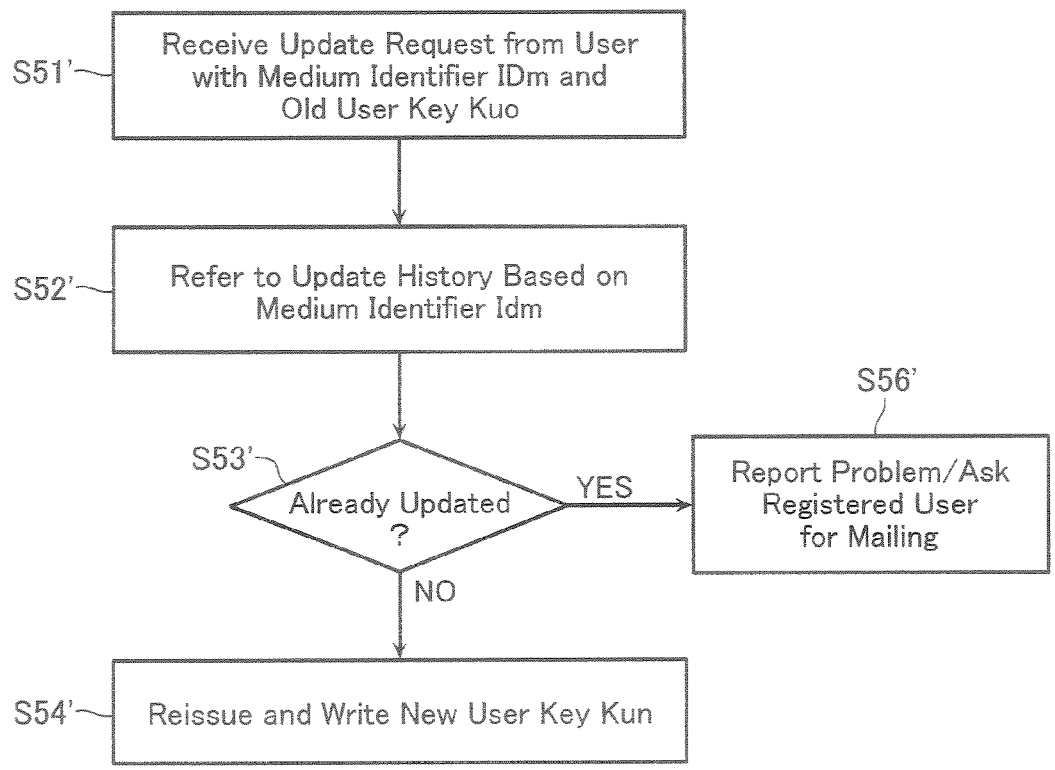
FIG. 6 is a flow chart explaining the case where an update with the same medium identifier has been done within a predetermined period.
Figure 7:
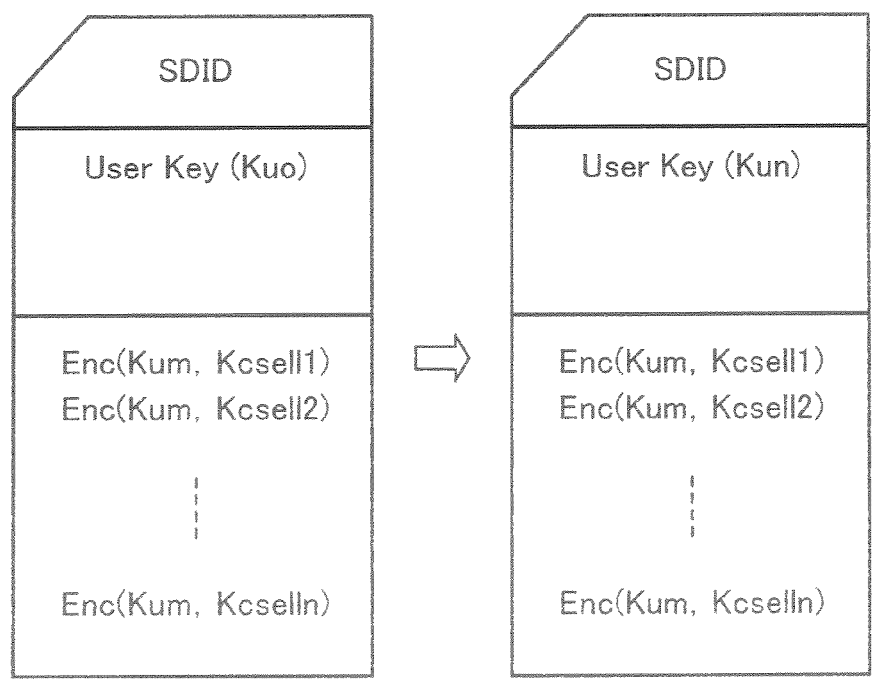
FIG. 7 illustrates changes in the stored data in a SD card before and after an update.
Figure 8:
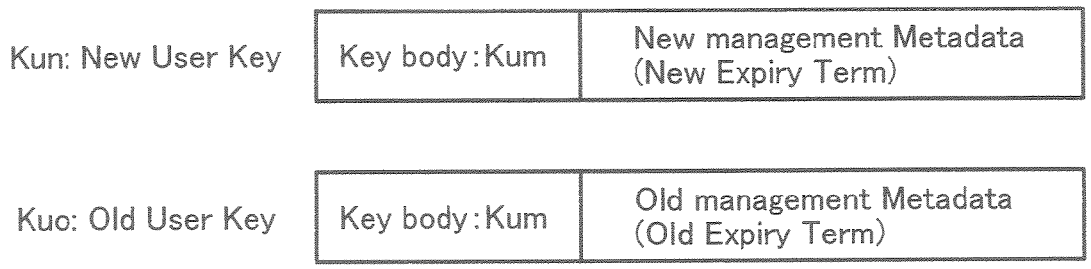
FIG. 8 illustrates changes of the user key data before and after an update.

New user key data Kun is re-issued in ST54' in the example of this FIG. 6. At this time, however, the whole user key data Ku is not rewritten. The key data Kum itself is kept unchanged, and only management metadata (data about the expiry term or the like is included) is rewritten (refer to FIG. 7 and FIG. 8).

Thereby, different from the case of the procedure of FIG. 4, it is unnecessary to perform a process of generating a content key Enc (Kun, Kcselli) encrypted by a new user key Kun instead of the content key Enc (Kuo, Kcselli) encrypted by the old user key Kuo and saved (ST55), and a burden of the system is reduced.

(Processing of the Mailed SD Card)

When a registered user's mailed SD card is not forgery but an authentic SD card, the authentic SD card which has another medium identifier is returned. As described above, the owner of an authentic SD card can be protected irrespective of an existence of a forged SD card owner by being registered as a user.

Figure 9:
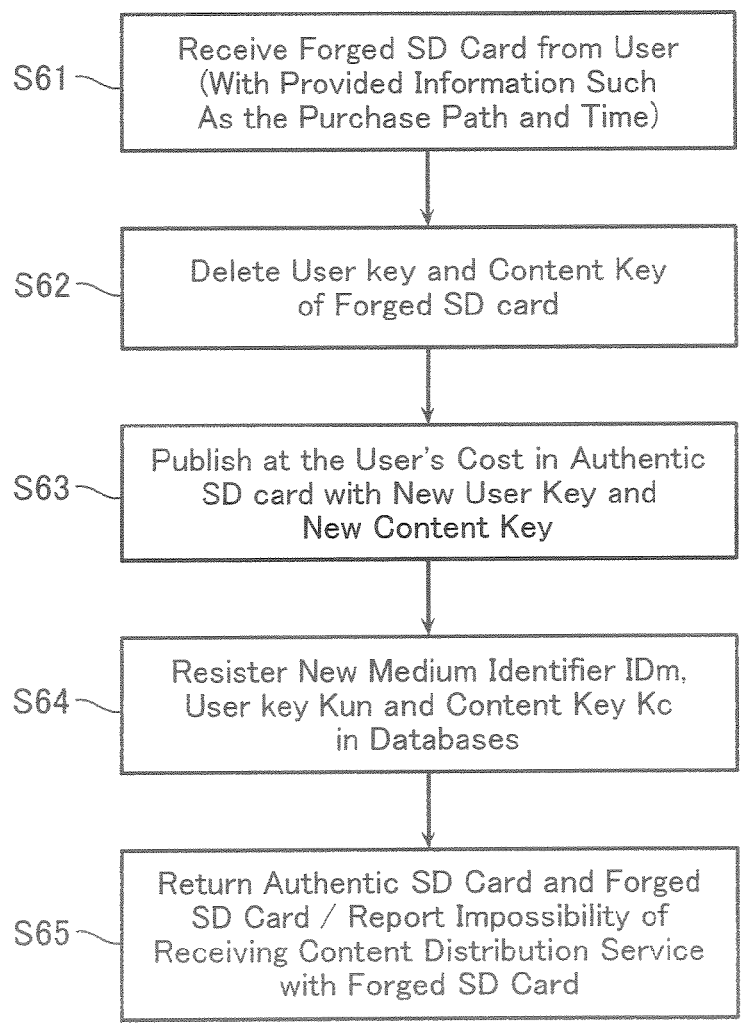
FIG. 9 is a flowchart explaining the process for when a registered user's mailed SD card is a forged SD card.

A process performed when a registered user's mailed SD card is a forged SD card, is explained with reference to the flowchart of FIG. 9.

When the license center receives the mailed forged SD card with provided information such as the purchase path and time thereof (S61), the license center deletes a user key and a content key of the forged SD card (S62), publishes at the user's cost an authentic SD card with a new user key and a new content key written therein (S63).

The new medium identifier, a user key, and a content key of the authentic SD card, are stored in the databases 42, 43, and 46 (S64). Then, this new authentic SD card and the forged SD card are returned to a user (S65). It reports to the user that various keys has been deleted in the forged SD card and it is impossible to receive a content distribution service (MQbic services).

Note that the process described in each of above-mentioned embodiments can be implemented by a program which can make a computer perform the process. The program can be stored in a storage medium, such as magnetic disks (a floppy (registered trademark) disk, a hard disk, etc.), an optical disk (CD-ROM, DVD etc.), a magneto-optical disk (MO), and a semiconductor memory.

Moreover, as this storage medium, scheme for storing may be of any type, as long as it is a storage medium enabled to store a program, readable by a computer.

Moreover, operating system (OS) working on a computer based on an indication of the program installed in the computer from the storage medium, a database management software, and a middleware such as network software, can implement part of the processes for realizing the embodiments.

Furthermore, the storage medium in the present invention is not limited to the medium that is independent of a computer. It may be a storage medium that downloads the program transmitted by a local area network (LAN) or the Internet etc., and stores or temporarily stores it.

Moreover, a storage medium is not limited to a single one. When the processes in the embodiments are performed by a plurality of media, the media are included in the storage medium according to the present invention. In addition, the medium configuration can be any type.

Note that a computer in the present invention is configured to perform each process in the embodiments based on a program stored in a storage medium. It may have any configurations. For example, it may be a single device such as a personal computer, or a system having a plurality of network-connected computers.

Moreover, a computer in the present invention is not limited to a personal computer, but includes a operation processing device included in a information processing device, and a microcomputer. It includes devices or apparatuses that can realize the function of the present invention by a program.

Furthermore, in the above-described embodiments, the update history by the medium identifier shown at the time of the update request is referred. As addition to this, it is possible to refer to the medium identifier shown in the user registration database 48, and when the matching user registration does not exist, the update of a user key may be refused.

Note that the present invention is not limited to the above-described embodiments themselves. In a practice phase, their components can be modified and embodied, as long as it does not depart from the spirit thereof. Moreover, merging two or more proper components indicated by the above-mentioned embodiments can form various inventions. For example, some components may be deleted from all the components shown in the embodiments. Furthermore, the components employed in different embodiments may be combined suitably.

AN EXPLANATION OF SYMBOLS

SDq . . . an SD card
1 . . . a system area

2 ... a hidden area
3 ... a protection area
4 ... a user data area
5 ... a encryption/decryption unit
20 ... a user terminal
21 ... a memory
22 ... a download unit
23 ... a SD card processing unit
25 ... a control unit
40 ... a license center unit,
41 ... a key delivery server
42 ... a medium key database
43 ... a user key database
44 ... a expiry term database
45 ... a update history database
46 ... a management key obtaining unit
47 ... The authenticated content ID database
51 ... The security module
52 ... a management key obtaining unit
53 ... a key encryption management unit

The invention claimed is:

1. A storage medium processing method for a storage medium and a user terminal, the storage medium being configured to store medium identifier data, medium unique key data generated based on the medium identifier data, user key data encrypted so that the user key data is decrypted using the medium unique key data, and content key data encrypted so that the content key data is decrypted using the user key data, the method comprising:

retaining, at the user terminal, content data encrypted so that the content data is decrypted using the content key data, the user terminal being connected to the storage medium;

requesting, at the user terminal to a license center, an update of both the user key data and an expiration term of the user key data from the license center by submitting the medium identifier data to the license center;

accessing, at the license center, an update history of the user key data corresponding to the submitted medium identifier data;

updating, at the license center, the user key data based on an update request, which includes an old user key, from the user terminal in response to an update of the user key data corresponding to the submitted medium identifier data having not been last performed within a predetermined period;

refusing, at the license center, the update request, which includes the old user key, from the user terminal in response to the update of the user key data corresponding to the submitted medium identifier data having last been performed within a predetermined period; and displaying, at the user terminal, a message requesting a mailing of the storage medium after a refusal of the update request.

2. The storage medium processing method according to claim 1, wherein the updating of the user key data further includes generating new encrypted content key data by encrypting the content key data using an updated user key data.

3. The storage medium processing method according to claim 1, wherein the user key data contains
data of a key body, and
management metadata for managing the user key data, and the license center retains an original key body and only updates the management metadata.

4. A storage medium processing device comprising:
a storage medium connected to the storage medium processing device and configured to store medium identifier data, medium unique key data generated based on the medium identifier data, user key data encrypted so that the user key data is decrypted using the medium unique key data, and content key data encrypted so that the content key data is decrypted using the user key data;

a data processor for data-processing of the storage medium via a user terminal that stores content data encrypted so that the content data is decrypted using the content key data;

an update history database configured to retain an update history of user key data associated with the medium identifier data; and a key delivery server configured
to receive an update request from the user terminal to update both the user key data and an expiration term of the user key data, the update request being accompanied by the medium identifier data, to update the user key data and publish new user key data when the update request, which includes an old user key, is proper, the key delivery server referring to the update history database and determining that the update request is proper in response to an update of the user key data corresponding to the submitted medium identifier data having not been last performed within a predetermined period, the new user key data being transmitted to the user terminal, and to refuse the update request, which includes the old user key, in response to the update of the user key data corresponding to the submitted medium identifier data having last been performed within a predetermined period, wherein the key delivery server displays a message requesting a mailing of the storage medium after a refusal by the key deliver server to update the user key data.

5. The storage medium processing device according to claim 4, further comprising:
a user key database-configured to retain the user key data, wherein the key delivery server rewrites the user key data stored in the user key database when performing the update of the user key data.

6. The storage medium processing device according to claim 4, wherein the key delivery server generates, when updating the user key data, new encrypted content key data by encrypting the content key data using the new user key data.

7. The storage medium processing device according to claim 4, wherein
the user key data contains
data of a key body, and
management metadata for managing the user key data, and the key delivery server retains, when executing an update of the user key data, an original key body and updates only the management metadata.

8. A non-transitory computer-readable medium storing computer readable instructions thereon that when executed by a storage medium and a user terminal cause the user terminal to perform a method, wherein the storage medium stores medium identifier data, medium unique key data generated based on the medium identifier data, user key data encrypted so that the user key data is decrypted using the medium unique key data, and content key data encrypted so that the content key data is decrypted using the user key data, the method comprising:

retaining, at a user terminal connected to the storage medium, content data encrypted so that the content data is decrypted using the content key data;

obtaining various kinds of data from a license center;

requesting both an update of the user key data and an expiration term of the user key data from the license center by submitting the medium identifier data to the license center;

retaining to an update history of the user key data corresponding to the submitted medium identifier data;

updating the user key data based on an update request, which includes an old user key, from the user terminal in response to an update of the user key data corresponding to the submitted medium identifier data having not been last performed within a predetermined period;

refusing the update request, which includes the old user key, from the user terminal in response to the update of the user key data corresponding to the submitted medium identifier data having last been performed within a predetermined period; and displaying, at the user terminal, a message requesting a mailing of the storage medium after a refusal of the update request.

9. A server that manages an availability of content data in a user terminal, the server comprising:

a database configured to store an update history of user key data which is stored in a storage medium which is connected to the user terminal, the storage medium being configured to store medium identifier data, medium unique key data generated based on the medium identifier data, user key data encrypted so that the user key data is decrypted using the medium unique key data, and content key data encrypted so that the content key data is decrypted using the user key data, the user terminal being configured to obtain, via a network, encrypted content data corresponding to the content key data;

a receiving unit configured to receive from the user terminal an update request, which includes an old user key, to update both the user key data and an expiration term of the user key data, the update request being accompanied by medium identifier data;

a user key update unit configured to refer to the update history of the user key data corresponding to the medium identifier data, issue and transmit new user key data in response to the update history showing that an update of the user key data corresponding to submitted medium identifier data was not last performed within a predetermined period, and transmit to the user terminal a response refusing to issue the new user key data and the updated expiration term in response to the update history showing that the update of the user key data corresponding to the submitted medium identifier data was last performed within a predetermined period, wherein the user terminal displays a message requesting a mailing of the storage medium after a refusal of the update request.

* * * * *